(12) United States Patent
Ashworth

(10) Patent No.: US 6,536,335 B1
(45) Date of Patent: Mar. 25, 2003

(54) JUICER AND SHAVER

(75) Inventor: Steven Wallace Ashworth, Jardine Lookout (HK)

(73) Assignee: Main Power Electrical Factory Ltd., Kowloon (HK)

( * ) Notice: Subject to any disclaimer, the term of this patent is extended or adjusted under 35 U.S.C. 154(b) by 0 days.

(21) Appl. No.: 10/160,432

(22) Filed: Jun. 4, 2002

(51) Int. Cl.[7] .............................. A23N 1/00; A23N 1/02; A47J 19/02; B02C 18/12
(52) U.S. Cl. ................................. 99/501; 99/484; 99/503; 99/504; 99/510; 241/DIG. 17; 241/101.2
(58) Field of Search ........................... 99/495, 501–508, 99/509–511, 513; 241/101.01, DIG. 17, 101.2

(56) References Cited

U.S. PATENT DOCUMENTS

| | | | | |
|---|---|---|---|---|
| 3,552,663 A | * | 1/1971 | Royals ................. | 241/DIG. 17 |
| 3,916,776 A | * | 11/1975 | Arao et al. ............. | 99/503 X |
| 4,125,064 A | * | 11/1978 | Ackeret ................. | 99/508 |
| 4,309,942 A | * | 1/1982 | DaSilva, Jr. ........... | 99/501 |
| 4,534,108 A | * | 8/1985 | Yamamoto et al. ...... | 99/504 |
| 4,706,559 A | * | 11/1987 | DeZarate ............... | 99/504 |
| 4,744,522 A | * | 5/1988 | Borgmann et al. ...... | 241/101.2 |
| 5,289,763 A | * | 3/1994 | LeRouzic et al. ....... | 99/503 |
| 5,875,706 A | * | 3/1999 | Borger et al. .......... | 99/510 X |
| 6,050,180 A | * | 4/2000 | Moline ................. | 99/511 |
| 6,065,861 A | * | 5/2000 | Chen ................... | 99/513 X |
| 6,202,547 B1 | * | 3/2001 | Tseng et al. ........... | 99/511 |
| 6,213,008 B1 | * | 4/2001 | Kuan .................... | 99/506 X |

* cited by examiner

Primary Examiner—Timothy F. Simone
(74) Attorney, Agent, or Firm—Leydig, Voit & Mayer, Ltd.

(57) ABSTRACT

A combination juicer and shaver includes a juicer portion removably receivable in juxtaposition to a shaver portion. The juicer portion includes a juicer for extracting juice from a food item. The shaver portion includes a chamber and a shaver in the chamber for producing shavings of a food item disposed in the chamber. A drive selectively produces operating movement of the shaver means and the juicer, and a coupling communicates the operating movement between the shaver and the juicer.

6 Claims, 2 Drawing Sheets

JUICER AND SHAVER

BACKGROUND OF THE INVENTION

1. Field of the Invention

The invention relates to domestic appliances and in particular to juicers and shavers for food items such as fruit and vegetables.

2. Background Information

It is well known that fresh fruit and vegetables are beneficial for maintaining a healthy body. Fruit and vegetable juice contains a lot of vitamins, minerals and fibre. For this reason juice makers have become popular is and there are a number of known varieties on the market.

Much of the fibre in fruit and vegetables is in the flesh. Many known juice makers merely extract the fruit juice from the flesh and thus do nor provide the benefit of the additional fibre. Alternatively, the flesh can be pulped and added to the fruit drink, for example by blending, however this results in a drink with a very thick pureed consistency which might not be as refreshing on a hot day.

It is known to cool drinks by adding ice cubes. One solution to the above-mentioned problems is to freeze cubes of fruit, or vegetables, and add these frozen cubes to the fruit, or vegetable, juice drink. However this still poses problems as the cubes can take a long time to thaw and eating frozen fruit, or vegetable, cubes is not easily done. Unless the drinker consumes the fruit, or vegetable, cubes they do not get the benefit of additional fibre from the flesh.

SUMMARY OF THE INVENTION

It is an object of the present invention to provide a juicer that overcomes or ameliorates the above-mentioned is disadvantages or at least provides the public with a useful alternative.

According to a first aspect of the invention there is provided a combination juicer and shaver including:
- a housing including a shaving chamber and a juicer tray removably disposed above the shaving chamber,
- a shaver blade and paddle disposed in juxtaposition in the shaving chamber,
- a motor to rotate the paddle, and
- a juicing cone with a drive coupling rotatably disposed in juxtaposition with the juicer tray, and wherein the drive coupling is operable to removably engage the paddle to cause rotation of the juicer cone.

Preferably, the housing also includes a collection container, the shaving chamber and juicer tray being in communication with the collection container.

Preferably, the juicer tray includes a juice collection portion, the juicing cone being disposed above the juice collection portion, and a gearbox having an input and an output shaft, the drive coupling disposed at the input shaft and the output shaft engaging the juicing cone.

Preferably, the shaving chamber has an opening, the shaver blade being disposed in juxtaposition with the opening, and wherein the paddle includes first and second mounting members and one or more paddle members disposed between the first and second mounting members, the first mounting member engaging an output shaft of the motor and the second mounting member adapted to removably engage the drive coupling.

Preferably, the collection container has a handle and a removable closure.

According to a second aspect of the invention there is provided a combination Juicer and shaver including:
- a shaver portion including a chamber and a shaving means in the chamber, the shaving means adapted co produce food shavings,
- a juicer portion including a juicing means for extracting juice,
- a drive means for producing operating movement in one of the shaving means or the juicing means, and
- a coupling, wherein the juicer portion is removably receivable in juxtaposition the shaver portion and the coupling communicates the operating movement between the shaving means and juicing means, Further aspects of the invention will become apparent from the following description, which is given by way of example only.

BRIEF DESCRIPTION OF THE DRAWINGS

Embodiments of the invention will now be described with reference to the accompanying drawings in which.

DESCRIPTION OF THE PREFERRED EMBODIMENTS

Figure 1:
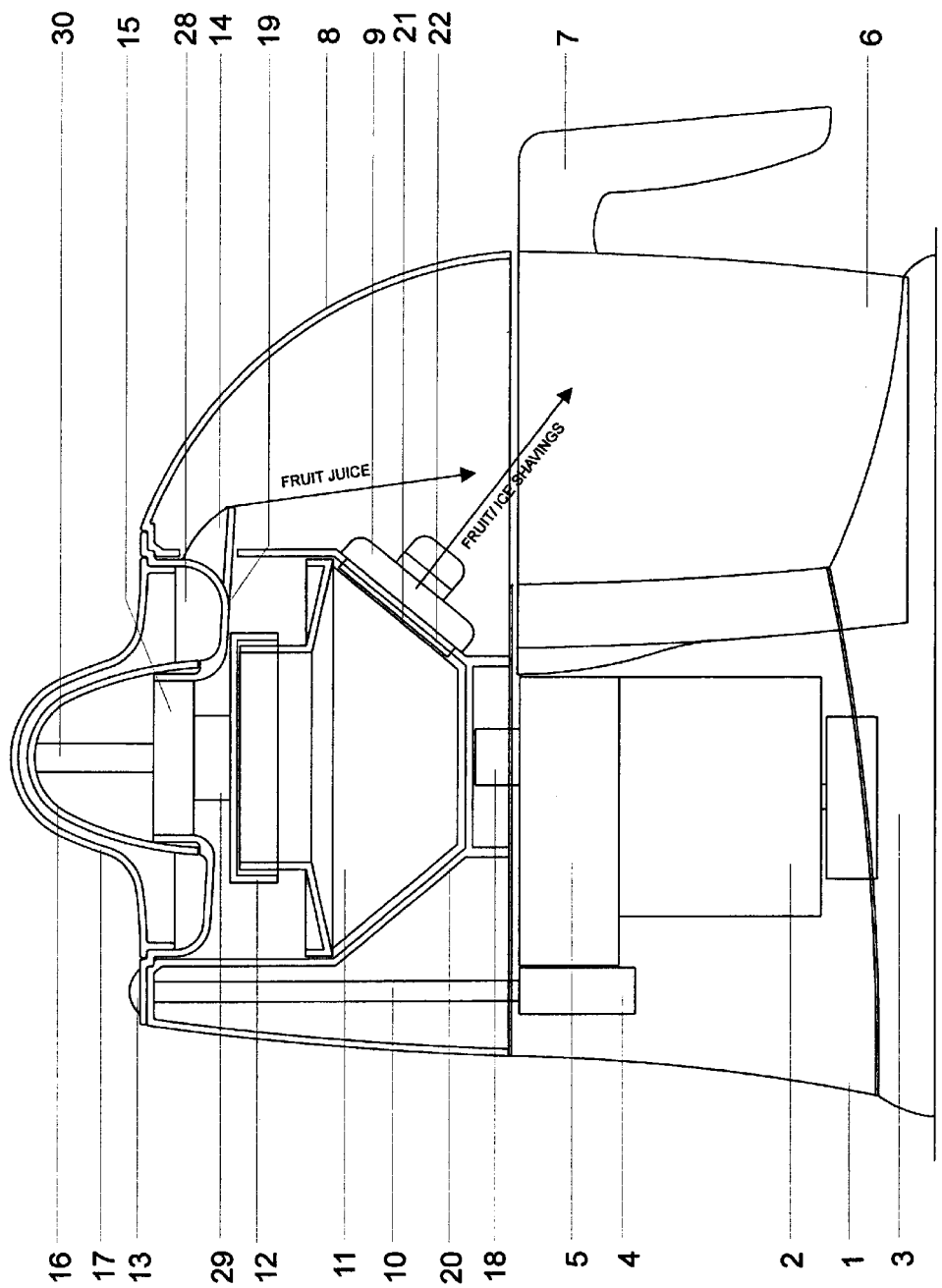
FIG. 1 illustrates a Section view through a juicer according to the invention.

Referring to the drawings wherein like reference numerals refer to like integers, an embodiment of a juicer according to the invention includes a lower housing portion 1 and an upper housing portion a. Within the lower housing portion 1 is a motor 2 chat drives a gearbox 5 and drive shaft 16. On the bottom of motor 2 is a cooling fan 3.

Also located within the lower portion 1 is a removable collection container 6 with a handle 7. The arrangement of collection container 6 and handle 7 is substantially in the form of a cup so that juice can be drunk directly from the collection container 6. The collection container includes a removable closure or lid (not shown) to facilitate storage of juice and shavings for consumption a: a later date.

Figure 2:
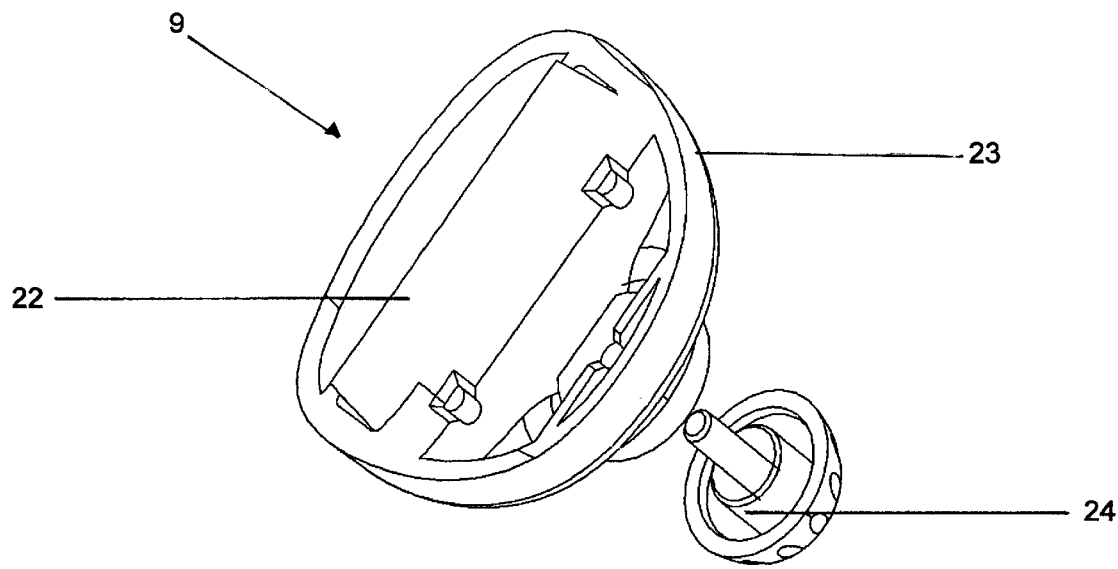
FIG. 2 illustrates a shaving blade unit of the juicer.

Upper housing portion 8 defines a shaving chamber 20 with a vertically orientated slot opening 21 located to be above collection container 6. Disposed in juxtaposition the opening 21 is a blade unit 9. The blade unit 9 is illustrated in more detail in FIG. 2, and comprises a blade 22 mounted on a blade holder 23. The blade 22 projects slightly through slot 21 into shaving chamber 20. A hand operable securing bolt 24 secures blade holder 23 to the outer surface of shaving chamber 20.

Figure 3:
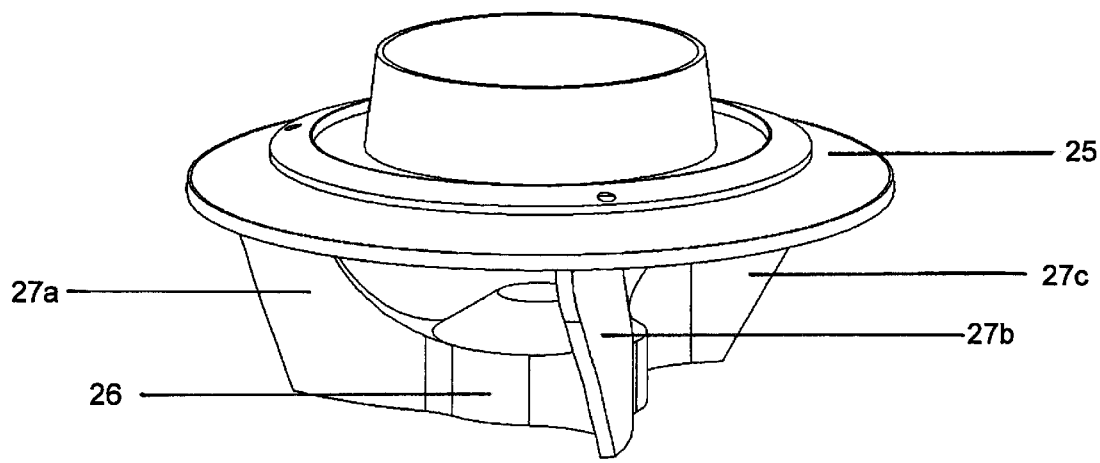
FIG. 3 illustrates a shaving paddle of the juicer.

The drive shaft 18 passes through the lower surface, or bottom, of shaving chamber 20. Located within shaving chamber 20, and mounted on shaft 18, is a shaving paddle 11 for pushing frozen fruit and/or vegetable portions past blade 22 projecting through opening 21. Shaving paddle 11 is illustrated in greater detail in FIG. 3.

Shaving paddle 11 includes an upper mounting ring 25 and a lower, smaller, mounting ring 26. Disposed between upper and lower mounting rings 25, 26 are three evenly spaced addle portions 27a, 27b, 27c. Lower mounting ring 26 has threaded coupling for engagement with the top of drive shaft 18. Paddle portions 27 push ice, or frozen portions of fruit and/or vegetables, around the edges of shaving chamber 20. The ice or frozen portions are pushed past blade 22 and shavings are ejected from slot 21 into collection container 6.

A juicer tray 19 removably locates on upper housing portion 8 above shaving chamber 20. The juicer tray 19 comprises a juice collection area 28 about its periphery. The juice collection area 28 has a juice spout 14 arranged above collection container 6. Centrally located on juicer tray 19 is a planetary reduction gearbox 15. The input shaft 29 of planetary reduction gearbox 15 is coupled to a hopper cone drive 12. Hopper cone drive 12 is operable to engage upper mounting ring 25 of shaving paddle 11. The upper output shaft 30 of planetary reduction gearbox 15 has amounted thereon a juicer cone 16 of known type. The juicer cone 16 locates above juicer tray 19.

When the juicer is not n use a juicer cover 17 covers juicer cone 16 and juicer tray 19.

A hand operable on/off switch 13 is mounted adjacent juicer tray 19 and has a shaft 1Q extending to an interlocked on/off switch 4.

In use, juicer tray 19 is removed from upper housing portion a as a complete unit with planetary reduction gearbox is, hopper cone drive 22, and juicer cone 16. Cubes of ice, or frozen fruit and/or vegetables, are introduced into shaving chamber 20. Juicer tray 19 is replaced on upper housing portion 8. Operation of switch 13 causes rotation of shaving paddle 11, via motor 2 and shaft 18. Cubed ice, or frozen vegetables and/or fruit are pushed around shaving chamber 20 and engage with shaving blade 22. The resulting shavings are ejected into collection container 6.

At the same time, hopper cone drive 12 transfers rotation is of shaving paddle 11 to planetary gearbox 15 and thus juicer cone 16. Fruit and/or vegetable portions can be engaged against rotating juicer cone 16 in known manner causing juice to flow into collection area 28 of collecting tray 19. The juice flows from juice spout 14 into collection container 6. Thus the invention provides a combined juice and sharer which can be operated together or singularly.

According to the invention frozen fruit and/or vegetable juice drinks can be made which are chilled by frozen fruit or vegetable shavings. The shavings are more easily eaten than frozen cubes, and provide additional fibre to the drink. Additionally, as the frozen fruit and/or vegetable shavings thaw they do not dilute the drink in the same manner that ice cubes or ice shavings would do.

Where in the foregoing description reference has, been made or integers or elements having known equivalents then such are included as if individually set forth herein, Embodiments of the invention have been described, however it is understood chat variations, improvement or modifications can take place without departure from the spirit of the invention or scope of the appended claims.

What is claimed is:

1. A combination juicer and shaver including:

a housing including a shaving chamber and a juicer tray removably disposed above the shaving chamber, a shaver blade and paddle disposed in juxtaposition in the shaving chamber, a motor to rotate the paddle, and a juicing cone with a drive coupling rotatably disposed in juxtaposition to the juicer tray, wherein the drive coupling removably engages the paddle to rotate the juicer cone.

2. The combination juicer and shaver as claimed in claim 1 wherein the housing includes a collection container, the shaving chamber and juicer tray being in communication with the collection container.

3. The combination juicer and shaver as claimed in claim 1 wherein the juicer tray includes a juice collection portion, the juicing cone being disposed above the juice collection portion, and a gearbox having an input and an output shaft, wherein the drive coupling is disposed at the input shaft and the output shaft engages the juicing cone.

4. The combination juicer and shaver as claimed in claim 1 wherein the shaving chamber has an opening, the shaver blade is disposed in juxtaposition to the opening, the paddle includes first and second mounting members and at least one paddle member is disposed between the first and second mounting members, the first mounting member engages an output shaft of the motor and the second mounting member removably engages the drive coupling.

5. The combination juicer and shaver as claimed in claim 2 wherein the collection container has a handle and a removable closure.

6. A combination juicer and shaver including:

a shaver portion including a chamber and shaving means in the chamber, the shaving means producing food shavings, a juicer portion including juicing means for extracting juice, drive means for selectively producing operating movement in one of the shaving means and the juicing means, and a coupling, wherein the juicer portion is removably receivable in juxtaposition to the shaver portion, and the coupling transmits the operating movement to the shaving means and to the juicing means.

* * * * *